C. L. Lochman,
Funnel,
N° 57,347.     Patented Aug. 21, 1866.
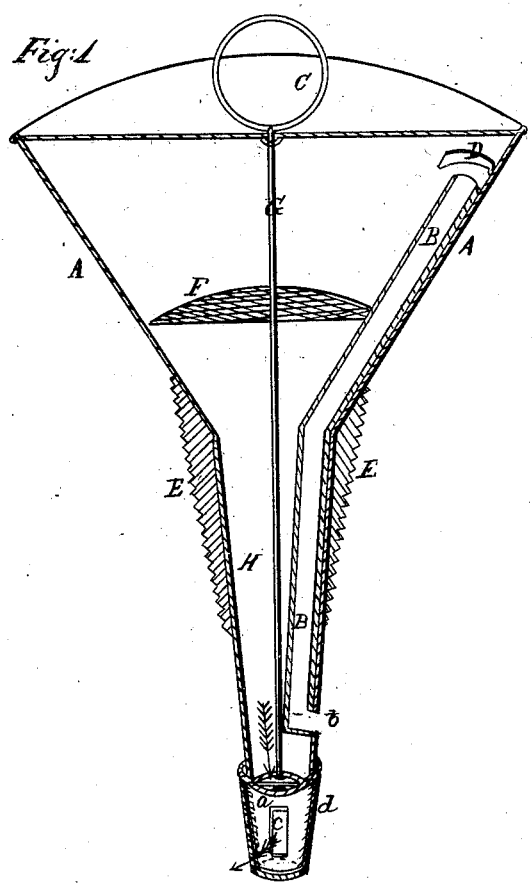
Witnesses:
Darius Smith
Geo. W. North
Inventor:
C. L. Lochman

UNITED STATES PATENT OFFICE.

C. L. LOCHMAN, OF CARLISLE, PENNSYLVANIA.

IMPROVEMENT IN FUNNELS.

Specification forming part of Letters Patent No. 57,347, dated August 21, 1866.

*To all whom it may concern:*

Be it known that I, C. L. LOCHMAN, of Carlisle, in the county of Cumberland and State of Pennsylvania, have invented a new and useful Improvement on a Funnel; and I do hereby declare that the following is a full, clear, and exact description of the construction and operation of the same, reference being had to the annexed drawings, making a part of this specification.

Figure 1 represents a longitudinal section of my funnel. A A is the body of the same; B B, an air-tube. *a* is a spigot or valve moving in the faucet part *d* by means of the connecting-rod G; E E, a metallic screw washer or fastener, and F is a strainer or colander.

Fig. 2 is a transverse section of the spigot. A represents it open, and B closed.

I construct my funnel in any convenient form and of the usual material used for ordinary funnels, providing it with a metallic screw, E E, in the form of a frustum of a cone, to fix it tightly in the bung-hole of a cask when being used, and having a valve fitted to the spout to open and close the same with the rod G in the manner of a spigot working in a faucet.

The fluid escapes through one or more openings in the faucet *d* when the openings or recesses in the spigot correspond with said openings, and a partial revolution of said spigot closes the spout of the funnel (when the vessel is full) and prevents the loss of any liquid that may remain in the funnel at its removal.

As the liquid enters the cask the displaced air escapes through the tube B B and any fluid that may escape with the air is prevented from passing over the funnel by the shield D.

The strainer F catches any foreign matter, in the form of small particles, that may be contained in the liquid.

What I claim as my invention, and desire to secure by Letters Patent, is—

1. A funnel provided at the spout with a spigot or valve worked by the upright rod H, for opening and closing the same, substantially as set forth.

2. A funnel having a valve at its nozzle and a screw washer or fastener at its neck, substantially as described.

3. In combination with a funnel having a metallic or an elastic washer, E E, and a valve or a stopple at the spout, an air-tube, B B, and shield D, for the purpose specified.

C. L. LOCHMAN.

Attest:
GEO. W. NORTH,
DAVID SMITH.